Sept. 18, 1962 R. M. SOULE, JR., ETAL 3,054,894
VEHICLE WEIGHING SYSTEM
Filed July 8, 1959 3 Sheets-Sheet 1

INVENTORS
R.M. SOULE JR. AND
J.H. AUER JR.
BY
Forest B. Hitchcock
THEIR ATTORNEY

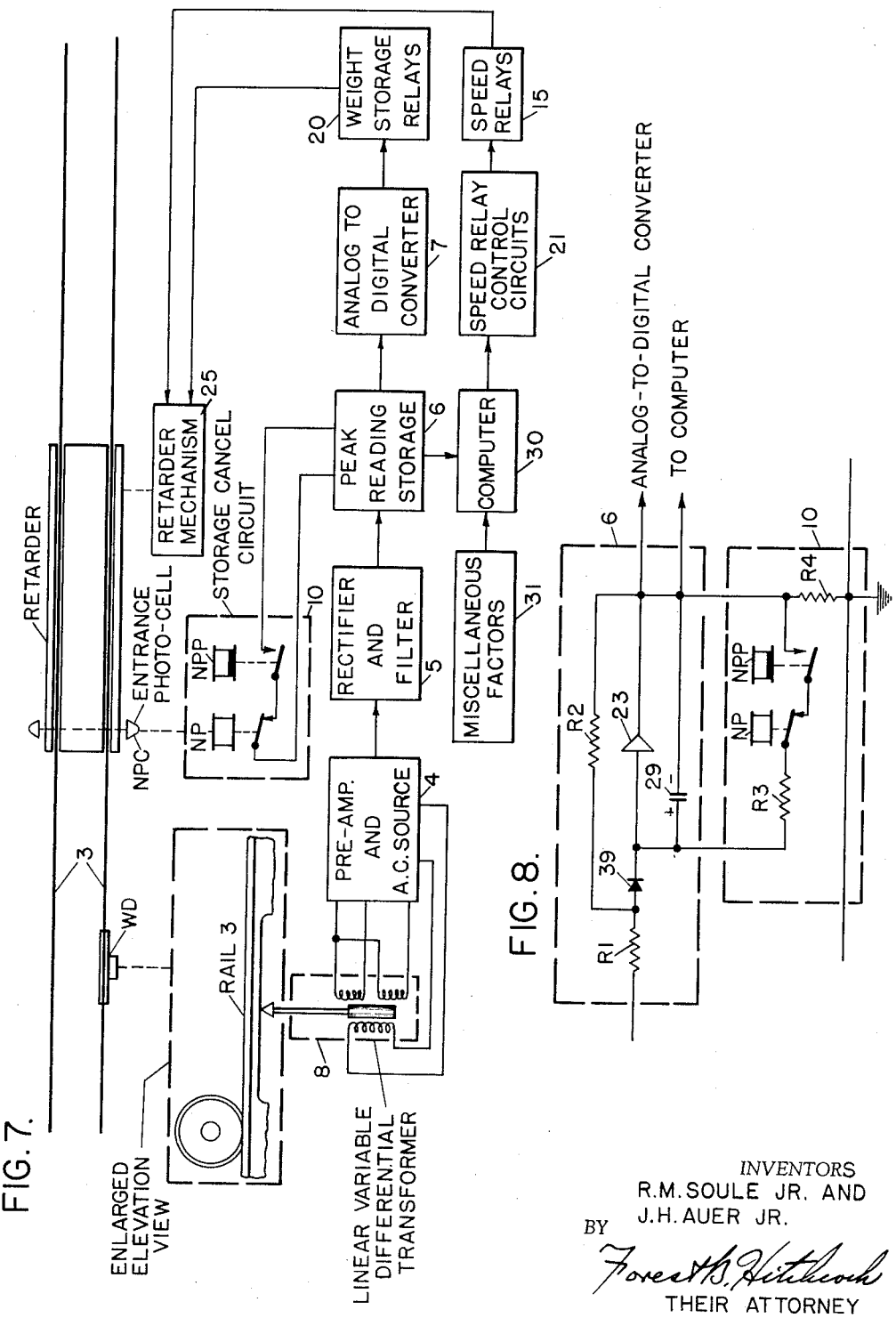

United States Patent Office 3,054,894
Patented Sept. 18, 1962

3,054,894
VEHICLE WEIGHING SYSTEM
Robert M. Soule, Jr., Chattanooga, Tenn., and John H. Auer, Jr., Rochester, N.Y., assignors to General Railway Signal Company, Rochester, N.Y.
Filed July 8, 1959, Ser. No. 825,807
1 Claim. (Cl. 246—251)

This invention relates to a vehicle weighing system and more particularly pertains to a weight sensitive device operated by means of a flexible rail member either directly or indirectly and whose output is transformed into an electrical voltage of an amplitude proportional to the flexure of the rail. This weighing device is particularly suitable for, but not limited to, use in railroad classification yards where an infinite number of weight parameters will provide more accurate control of the car retarders.

Heretofore, in automatic car systems several weight categories in the form of voltages were applied to the computer for solving the equations of motion as a car rolled down the hump, whereas in the embodiment of this invention the number of weight categories is unlimited; consequently a more exact and reliable result will be obtained from the computer for better control of the car retarder.

The present invention proposes a means of supplying more weight parameters to the computer so that the braking force applied to the cars, or cuts of cars, as they progress toward their destination track can be governed to a more accurate degree of control. This application also shows how this device may be adapted to present systems such as disclosed in prior U.S. patent applications Ser. No. 513,364, filed June 6, 1955, and Ser. No. 782,153, filed December 22, 1958.

The weight detector means of this invention comprises a transducer which in this form translates a mechanical deflection of a rail section into electrical energy. This application is unique in that it supplies an infinite number of car weights, within the range of their weights, for use in conjunction with a computer for solving the equations of motion of a car. In this invention the said transducer is an active circuit rather than passive, since energy is supplied to it in the form of an alternating current voltage of a suitable fixed frequency. This transducer element can be commercially produced to provide the necessary reliability for railroad application and will operate under extreme temperature conditions with the range of —65° to 200° fahrenheit. The operating principle of a transducer of this type is well known in the prior art and can be learned from bulletin No. 101 of the Daytronic Corporation, Dayton 2, Ohio.

The weighing device herein presented can be adapted to present systems for the control of a retarder, wherein several weight categories are used to solve the equations of motion of a car, and likewise are used to control respective weight relays, one for each category. Since it is advantageous to deal only with a restricted number of weight relays for economical reasons, these will be retained, and the present scheme for weight detection will be converted from an infinite number of weight categories, which is in the form of an equivalent analog voltage, into the several weight groups by an analog-to-digital converter, which will provide the output to the current systems for the respective voltage categories for each weight storage relay.

In the drawings presented herewith a lever mechanism is used to amplify the movement of the rail in order to gain sensitivity for the transducer but it should be understood that this is not necessarily a requisite to the principle functioning of the device. If sufficient sensitivity can be gained without the use of a lever to operate the apparatus following the weight detector, then a direct contact of the transducer plunger can be made to the deflecting rail.

One object of this invention is to provide a means for determining an infinite number of categories of car weight by means of a flexible rail which is used to operate a mechanical to electrical transducer. The transducer in turn provides an output which can be readily amplified and manipulated in various other ways in order to produce the desired result.

Another object of this invention is to provide a means for storing the output voltage from the transducer in a representative analog voltage of the car weight so that it can be made usable by the computer whenever desired.

Another object of this invention is to provide a means for cancelling the voltage analog of the car weight when it is no longer required by the computer or the analog-to-digital converter so that the weight stored means of the above object will be cleared out and ready for the next succeeding car's data.

Another object of this invention is to provide a mechanical amplifying device such as a lever in combination with the flexible rail and the transducer in order to make the latter more sensitive in response to the deflection of the rail.

Another object of this invention is to provide a car retarder system in which all of the above features may be combined along with the features of former systems such as mentioned in the above two cited prior patent applications.

Further objects, purposes and characteristic features of the invention will be pointed out as the description of the invention progresses. Reference will be made to the accompanying drawings in which like reference characters refer to like parts, and in which:

FIG. 7 is a block diagram view to illustrate the general working principle of the present invention in relationship to existing apparatus; and FIG. 8 is a circuit arrangement for the peak reading storage block and the storage cancel block of FIG. 7.

Figure 1:
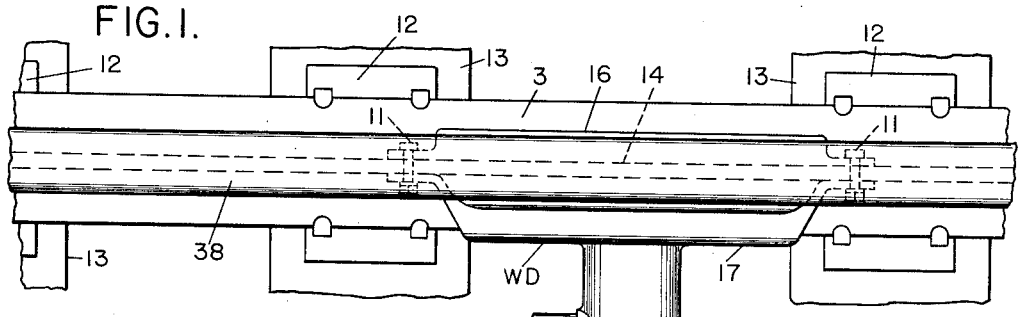
FIG. 1 is a plan view of a track rail mounted on usual railroad ties and having a weight detector device of the present invention attached thereto.
Figure 2:
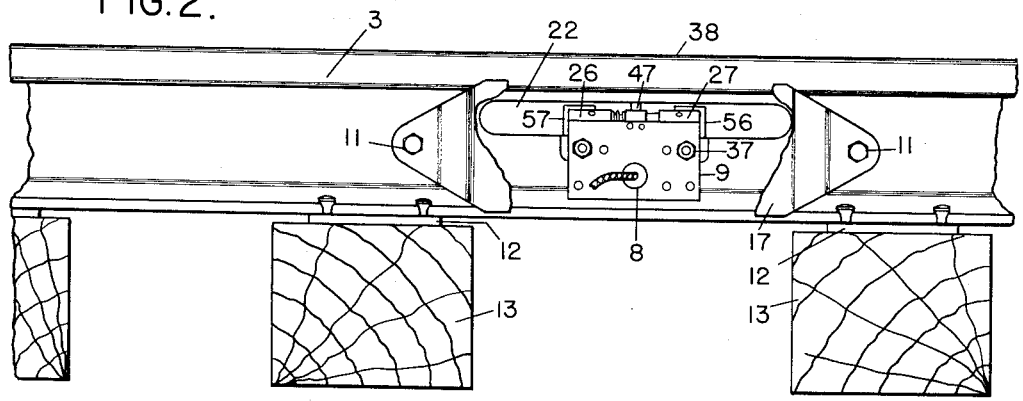
FIG. 2 is a side elevation view of the apparatus shown in FIG. 1 with part of the weight detector device casing broken away to show the location of the transducer with respect to the flexible rail section.

Referring now to FIGS. 1 and 2 of the drawings a track rail 3 is shown mounted on the usual tie plates 12 and spaced ties 13. The weight detector device WD casings are shown attached to the web portion 14 of the track rail 3 by means of the bolts 11. The weight detector device WD is located on the rail portion which is situated between two of the spaced ties 13. The protective casing comprises two cover pieces 16 and 17 one located on each side of the rail 3. Bolts 11 passing through the cover pieces 16 and 17 and the web portion 14 of the rail hold the assembly together. Gaskets 19 (see FIG. 4)

are provided between the edges of the cover pieces and the rail 3 to seal out all moisture and dirt.

With reference now more particularly to the detailed views FIGS. 3 to 6 inclusive, the standard stock rail 3 is provided with an elongated longitudinal opening 22 in its web portion 14 thereof. This opening 22 is located directly under the head portion 38 of the rail 3 and the circumvential surfaces thereof are machined flat on both the top and bottom sides 18 and 69. The web portion below the opening 22 is also machined on both sides in a vertical plane as shown at 24 to provide flat mounting surfaces for the supporting framework of the weight detector device WD. This particular rail head section is then suitably heat treated to provide the necessary elasticity to allow deflection without developing a permanent set.

The main supporting frame is located on the outer side of the rail web 14 and comprises two vertically extending blocks 26 and 27 which are connected together as by welding or other suitable means with a horizontal strap member 9. A U-shaped bracket 32 is provided on the inner gauge side of the rail web 14 with its legs extending upward. A complete supporting framework is fastened to the rail web 14 by means of two through bolts 33 passing through holes 35 provided in the rail web 14. The bolts 33 pass through the block portions 26 and 27 of the supporting frame and each has an enlarged portion 34 which seats in the holes 35 in the rail web 14. Nuts 36 are provided to clamp the bracket 32 in place whereas taper nuts 37 are provided to center and hold the main supporting frame structure tight against machined portions 24 of the rail web 14. The U-shaped bracket 32 provides a means for mounting the limiting deflection blocks 56 and 57 beneath the rail head 38. These are spaced from the rail head 38 by some fixed amount so that some maximum deflection of the rail head 38 cannot be exceeded at times when a locomotive may pass over the section. These blocks 56 and 57 then prevent damage to the mechanism mounted below the rail head 38 and also prevents the rail head 38 itself from being stressed beyond its elastic limit.

Figure 3:
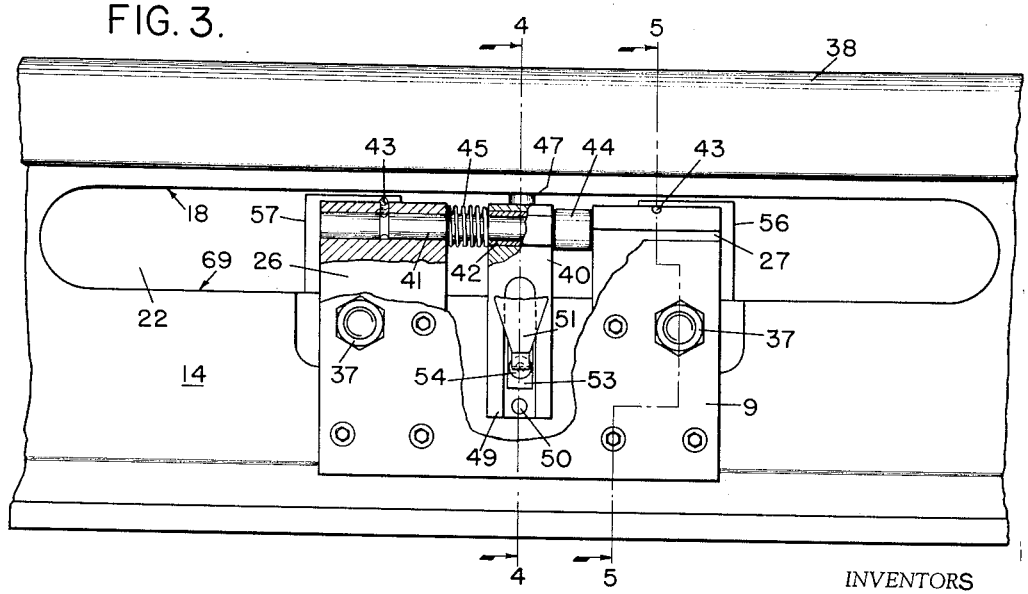
FIG. 3 is an enlarged side elevation view similar to FIG. 2 with the weight detector casing completely removed to show the mounting of the weight detector device of the present invention to the rail in relationship to the cut out portion of the rail web, certain parts being shown in cross section for clearness.
Figure 4:
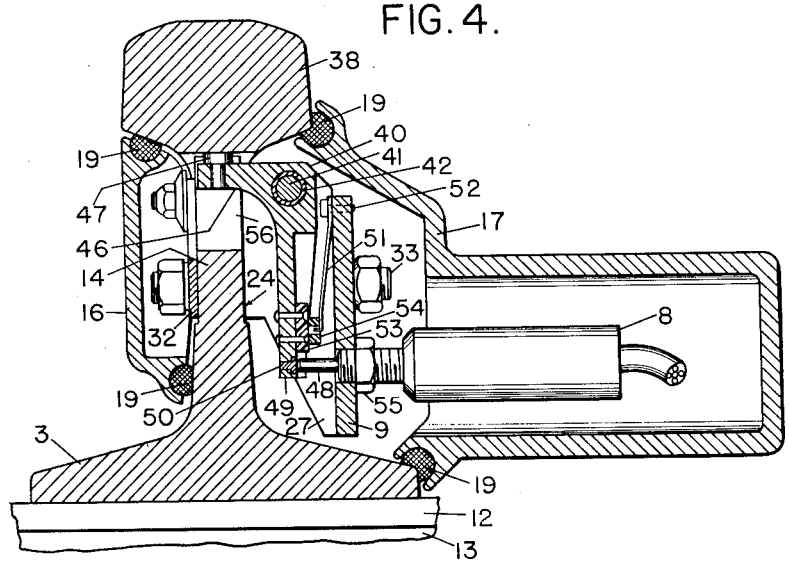
FIG. 4 is a cross sectional view of the weight detector device of the present invention taken on the line 4—4 of FIG. 3 as viewed in the direction of the arrows.
Figure 5:
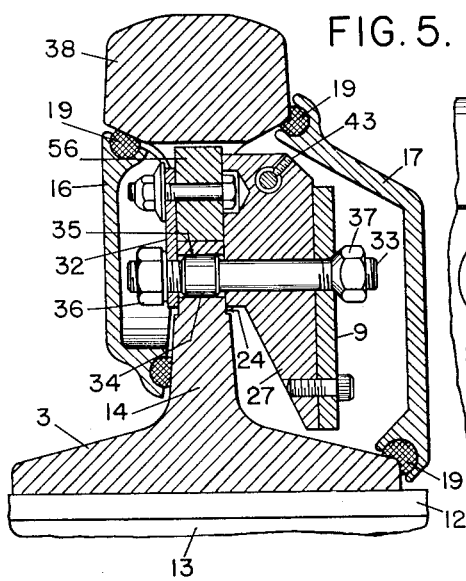
FIG. 5 is a cross sectional view of the weight detector device taken on the line 5—5 of FIG. 3 as viewed in the direction of the arrows.
Figure 6:
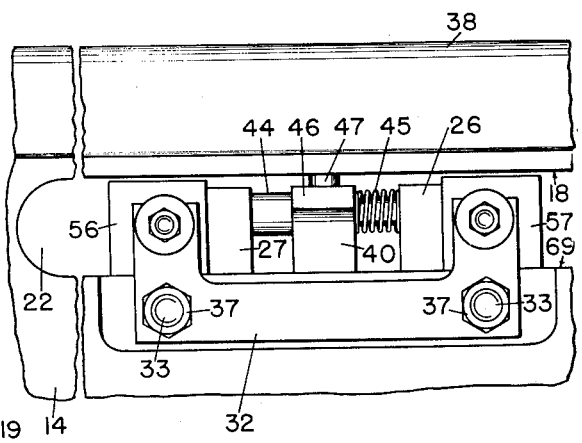
FIG. 6 is a side elevation view of the left side of FIG. 5 with the casing removed and particularly shows the rail deflection limiting blocks and their supporting bracket.

As shown more clearly in FIGS. 3 and 4, a multiplying angle lever 40 and a shaft 41 are mounted in and between the two supporting block members 26 and 27. The angle lever 40 is mounted over a bushing 42 allowing it to freely rotate on shaft 41. The shaft 41 passes through supporting blocks 26 and 27 and is secured thereto by means of set screws 43. The complete unit is centered between the two blocks 26 and 27 by means of a spacing bushing 44 and a compression spring 45. This combination allows free rotary movement of the angle lever 40 and yet keeps the angle lever 40 centered and free of clearance variations.

The short end 46 of the multiplying angle lever 40 projects horizontally into the longitudinal opening 22 under the rail head 38 and is provided with a hardened pin 47 positioned directly under the center portion of the rail head 38. The long end 49 of the multiplying angle lever 40 projects vertically downward and is provided at its lower end with a bearing surface in the form of a hardened pin 50 which bears against the transducer plunger 48. Angle lever 40 is biased towards a clockwise rotary movement by means of a leaf spring 51 which is suitably mounted and interposed between the long end 49 of the angle lever 40 and the cross frame member 9 thus insuring constant contact between the pin 47 of the angle lever 40 and the bottom surface of the rail head portion 38. The spring 51 is designed and mounted on the upper end by two bolts 52 in such a manner that approximately one pound of force is applied to the longer end 49 of the angle lever 40. Nylon blocks 53 and 54 are provided to bear against each other at this point, one block 53 riveted to the long end 49 of the lever 40 and the other 54 held in position by a nib on the end of spring 51.

As shown more clearly in FIG. 4 the transducer 8 is mounted on vertical plate 9 and adjusted to the proper position by screwing it into plate 9 until the output reading is zero. At this point the nut 55 should be locked against plate 9 for then the core within the transducer unit 8 will be in a neutral position. During the above adjustment procedure an alternating current potential must be applied to the primary in accordance with the rating of the particular transducer used.

Aside from the weighing device itself, other apparatus used in conjunction with it are shown in FIG. 7 in block diagram form. Certain of these devices, known to the art, are shown in block form. The particular arrangement of the storage cancel circuit 10 and the peak storage apparatus 6, according to this embodiment of the invention are shown in detail in FIG. 8. Item 23 is an operational amplifier providing extremely high gain, across which a capacitor 29 stores the peak voltage value attained by the amplifier 23. The diode 39 provides a means for allowing only positive-going voltages to effect the operational amplifier 23. More will be stated about these devices as the operation of the system is discussed in detail. The relay contacts on the NP and NPP relays shunt the stored voltage across the capacitor 29 when the system requires clearance for the storage of a new voltage.

*Operation of the Weighing System*

When a car wheel runs over the flexible rail head 38, a deflection is produced proportional to the partial weight of the car as supported by this wheel and axle assembly. This deflection is transmitted through the L-shaped lever 40 to the plunger 48 of the differential transformer unit 8. The translational motion of plunger 48 moves the magnetic core within the winding assembly, which is attached to the other end of the plunger, to a position which unbalances the original neutral flux position of this core in such a manner that a voltage is added to one-half of the secondary winding and subtracted from the other half. As heretofore mentioned the primary must be supplied with an alternating current voltage suitable for the transformer unit. The output voltage thus produced can be amplified to any desirable extent as represented in block 4 of FIG. 7 by some conventional form of amplifier responsive to the frequency applied from the A.C. source. It is desirable to maintain the A.C. source separate, or isolate it by some suitable shielding to prevent feedback from the amplifier into this A.C. source. The output of this amplifier can then be fed into a filter and rectifier unit 5 wherein the filter will first select only the desirable frequency and eliminate all extraneous frequencies which may be established by noise or other local conditions. The filtered output can then be rectified so that the direct current voltage appearing on the output of this rectifier will then represent the degree of deflection of the rail head.

As the car wheels pass over the weight detector WD, each one provides the peak reading storage unit 6 with its independent voltage value. However, the maximum value of any particular wheel and axle assembly will be retained due to the action of the diode 39, the operational amplifier 23, and the storage capacitor 29. For example, if wheel 2 on a car produces a higher reading than wheel 1, the diode will conduct the current into the operational amplifier 23 so that capacitor 29 will be charged to a higher value than formerly. On the other hand, should the deflection of the rail under wheel 2 be less than it had been for wheel 1, the output from the operational amplifier will remain unchanged because of the voltage stored on capacitor 29 due to the weight of wheel 1 will not be dissipated because the action of the diode prevents such dissipation. Thus the circuit as shown will store only the maximum voltage applied to the input circuit.

This D.C. voltage at this point in the system is used in two ways. First, a conversion is made into digital form and therein separated into three weight categories in order that these three independent voltages can be used to control the existing weight storage relays which in present systems are separated into three corresponding weight categories. Secondly, this same D.C. voltage may be used by the computer 30 to solve the equations of motion for the car directly. Heretofore the equation $$g_0 = g\left(\frac{1}{1+\frac{nWw}{W}}\right)$$

wherein:

$g_0$ = corrected acceleration of gravity
$g$ = acceleration of gravity
$n$ = number of wheels on the car
$Ww$ = weight of each wheel
$W$ = total weight of car which is given in line 13 on page 18 of U.S. patent application Ser. No. 782,153, had been solved by the use of three separate weight group voltages within the computer 30. This, in turn, led to three separate corresponding groups for the value of $g_0$, which when substituted in the above equation in the aforementioned patent application led to only approximate results for the exit velocity from the retarder for any particular car.

Now having a continuous band of an infinite number of weight values for the various cars, the value of $g_0$ as solved by the computer will be more exact, and as a result the value of the exit velocity from the retarder will be more exact. The computed output, as in the former applications, serves as a drive for the speed control relay circuits 21 which, in turn, controls the speed relays 15 and eventually the retarder mechanism 25.

The storage cancel circuit 10 operates in parallel with the storage capacitor 29. It will be noted that this circuit is normally open. However, when a car severs the light beam falling on the photo-electric cell NPC at the entrance to the retarder, the relay NP will be energized. As a result of another contact (not shown) on the relay NP being engaged after this coil is energized, the relay NPP will become energized from an independent voltage source. Under these conditions it will be noted that the circuit across capacitor 29 is still open.

The next event which occurs is that of the trailing edge of the car progressing beyond the light beam of the photoelectric cell, which action will now drop out the NP relay. It will be noted that the NPP relay is a slow release type; consequently, before its contacts open, a shunt circuit exists across capacitor 29 in FIG. 8 through resistor R3. This shunting of the capacitor will dissipate the stored energy into the R3 resistor thereby discharging capacitor 29. Finally after the contacts open on the NPP relay, the circuit will be prepared before the next oncoming car.

In summary, it can clearly be seen that this device offers a continuous weight parameter to the computer which heretofore was unattainable. The computer, in turn, being supplied with more accurate information is capable of providing a more accurate control of the car retarder.

Having thus described a vehicle weighing device providing a continuous weight parameter to a car retarder system rather than lumped group parameters, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention as defined in the appended claim.

What we claim is:

A weighing system for use in a car retarder control system for controlling the operation by a computer of a car retarder disposed in a stretch of railway track, said weighing system comprising, (a) a weighing rail in the stretch of track,
(b) a differential transformer having a normally energized primary winding and two differential windings, one of which windings normally cancels the output of the other,
(c) said differential transformer having a movable plunger actuated in accordance with the deflection of said weighing rail to increase the output of one of the differential windings and to decrease the output of the other differential winding proportional to the deflection of said weighing rail,
(d) a capacitor,
(e) circuit means responsive to the output of said differential windings for charging said capacitor to a maximum potential proportional to the maximum amount of deflection of the weighing rail by any one of several wheels of a car reflecting the maximum weight on any one wheel,
(f) occupancy detection means spaced from said weighing rail in said stretch of track for registering the presence of a car after several of the car wheels have passed over said weighing rail, and
(g) means responsive to said occupancy detection means for providing an input to said computer proportional to said maximum potential registered in said capacitor,
(h) said occupancy detection means also being effective to apply a shunt across the capacitor for a predetermined interval to discharge the capacitor.

References Cited in the file of this patent

UNITED STATES PATENTS

| | | |
|---|---|---|
| 1,787,752 | McFarland | Jan. 6, 1931 |
| 2,627,119 | Graham | Feb. 3, 1953 |
| 2,640,967 | MacGeorge | June 2, 1953 |
| 2,779,583 | Bone | Jan. 29, 1957 |
| 2,869,853 | Pratt | Jan. 20, 1959 |
| 2,906,865 | Jefferson | Sept. 29, 1959 |

FOREIGN PATENTS

| | | |
|---|---|---|
| 880,182 | France | Dec. 18, 1942 |